(12) United States Patent
Banerjee et al.

(10) Patent No.: US 11,394,654 B2
(45) Date of Patent: Jul. 19, 2022

(54) DATA MANAGEMENT BETWEEN LOCAL CLIENT AND CLOUD BASED APPLICATION

(71) Applicant: TELEFONAKTIEBOLAGET LM ERICSSON (PUBL), Stockholm (SE)

(72) Inventors: Suman Banerjee, Madison, WI (US); Alok Sharma, Sarasato, FL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/827,440

(22) Filed: Mar. 23, 2020

(65) Prior Publication Data
US 2021/0297359 A1 Sep. 23, 2021

(51) Int. Cl.
| | |
|---|---|
| *H04L 12/801* | (2013.01) |
| *G06F 9/455* | (2018.01) |
| *H04L 1/00* | (2006.01) |
| *H04L 12/707* | (2013.01) |
| *H04L 12/715* | (2013.01) |
| *H04L 12/891* | (2013.01) |
| *H04L 47/10* | (2022.01) |
| *H04L 45/24* | (2022.01) |
| *H04L 45/64* | (2022.01) |
| *H04L 47/41* | (2022.01) |

(52) U.S. Cl.
CPC .......... *H04L 47/29* (2013.01); *G06F 9/45558* (2013.01); *H04L 1/0041* (2013.01); *H04L 45/24* (2013.01); *H04L 45/64* (2013.01); *H04L 47/41* (2013.01); *G06F 2009/45595* (2013.01)

(58) Field of Classification Search
CPC ....... H04L 47/29; H04L 47/41; H04L 1/0041; H04L 45/24; H04L 45/64; G06F 9/45558; G06F 2009/45595
See application file for complete search history.

(56) References Cited

U.S. PATENT DOCUMENTS

| | | | |
|---|---|---|---|
| 9,357,427 B2 * | 5/2016 | Sze | ......................... H04L 47/41 |
| 9,578,074 B2 * | 2/2017 | Kalman | .................. H04L 1/004 |
| 10,983,810 B2 * | 4/2021 | Banerjee | ............. G06F 9/45533 |

(Continued)

OTHER PUBLICATIONS

PCT Internatonal Search Report issued for International application No. PCT/IB2021/052340—dated Jun. 9, 2021.

(Continued)

*Primary Examiner* — Habte Mered

(57) ABSTRACT

A method includes establishing a communication link between a communication interface of a first computing device and a virtual machine executed by a second computing device, receiving an available bandwidth parameter associated with the communication link, receiving link characteristic data associated with the communication interface, and configuring a characteristic of the communication link based on the available bandwidth parameter and the link characteristic data. A system includes a first computing device including a communication interface and executing a policy manager and a second computing device executing a virtual machine. The policy manager is to receive an available bandwidth parameter associated with the communication link, receive link characteristic data associated with the communication interface, and configure a characteristic of the communication link based on the available bandwidth parameter and the link characteristic data.

16 Claims, 3 Drawing Sheets

(56) References Cited

U.S. PATENT DOCUMENTS

| | | | |
|---|---|---|---|
| 2008/0256421 A1* | 10/2008 | Gerstel | H03M 13/353 |
| | | | 714/776 |
| 2012/0011413 A1* | 1/2012 | Liu | H04L 1/0009 |
| | | | 714/746 |
| 2015/0039744 A1 | 2/2015 | Haseeb et al. | |
| 2016/0254959 A1* | 9/2016 | Arndt | H04L 41/0896 |
| | | | 370/235 |
| 2018/0097555 A1* | 4/2018 | Nammi | H04L 1/0009 |
| 2018/0324149 A1* | 11/2018 | Sharma | G06F 9/45558 |
| 2018/0324227 A1* | 11/2018 | Sharma | H04L 67/08 |
| 2018/0359053 A1* | 12/2018 | Hassan | H04L 69/324 |
| 2019/0028231 A1* | 1/2019 | Wang | H04L 1/0041 |
| 2019/0104437 A1 | 4/2019 | Bartfai-Walcott et al. | |
| 2019/0268421 A1* | 8/2019 | Markuze | H04L 67/141 |
| 2019/0339997 A1* | 11/2019 | Momchilov | G06F 3/0488 |
| 2020/0092167 A1 | 3/2020 | Khan et al. | |

OTHER PUBLICATIONS

PCT Written Opinion of the International Searching Authority for International application No. PCT/IB2021/052340—dated Jun. 9, 2021.

* cited by examiner

DATA MANAGEMENT BETWEEN LOCAL CLIENT AND CLOUD BASED APPLICATION

BACKGROUND

Field of the Disclosure

The present disclosure relates generally to computing systems, and more particularly, to data management system for managing data transfer between a local client and a cloud based application.

Description of the Related Art

Computing networks are employed to connect multiple users to shared resources. A cloud based virtual computing arrangement allows a local client to interact with a remotely distributed computing resource to perform the processing tasks for the local client. The cloud based virtual computing arrangement executes a virtual machine to execute a remote application. A user interacts with the remote application via the local client. Input data and commands generated by the user on the local client are transmitted to the remote application via a data connection. The remote application processes the data/commands received over the network connection and generates output data that is transmitted via the same data connection to the local client for the user to consume.

The performance experienced by the user is highly sensitive to the time taken by the data transmission between the local client and the virtual machine implementing the remote application. For example, the user may need to upload a large file to the remote application over a slow data connection. In another example, the user may be running a delay-sensitive remote application where the bandwidth required may be low, but the last mile link from the local client is wireless and lossy. In both the cases, the performance of the remote application from the user's perspective may appear sluggish as compared to an alternative setup where the applications are running in the local client.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 1:
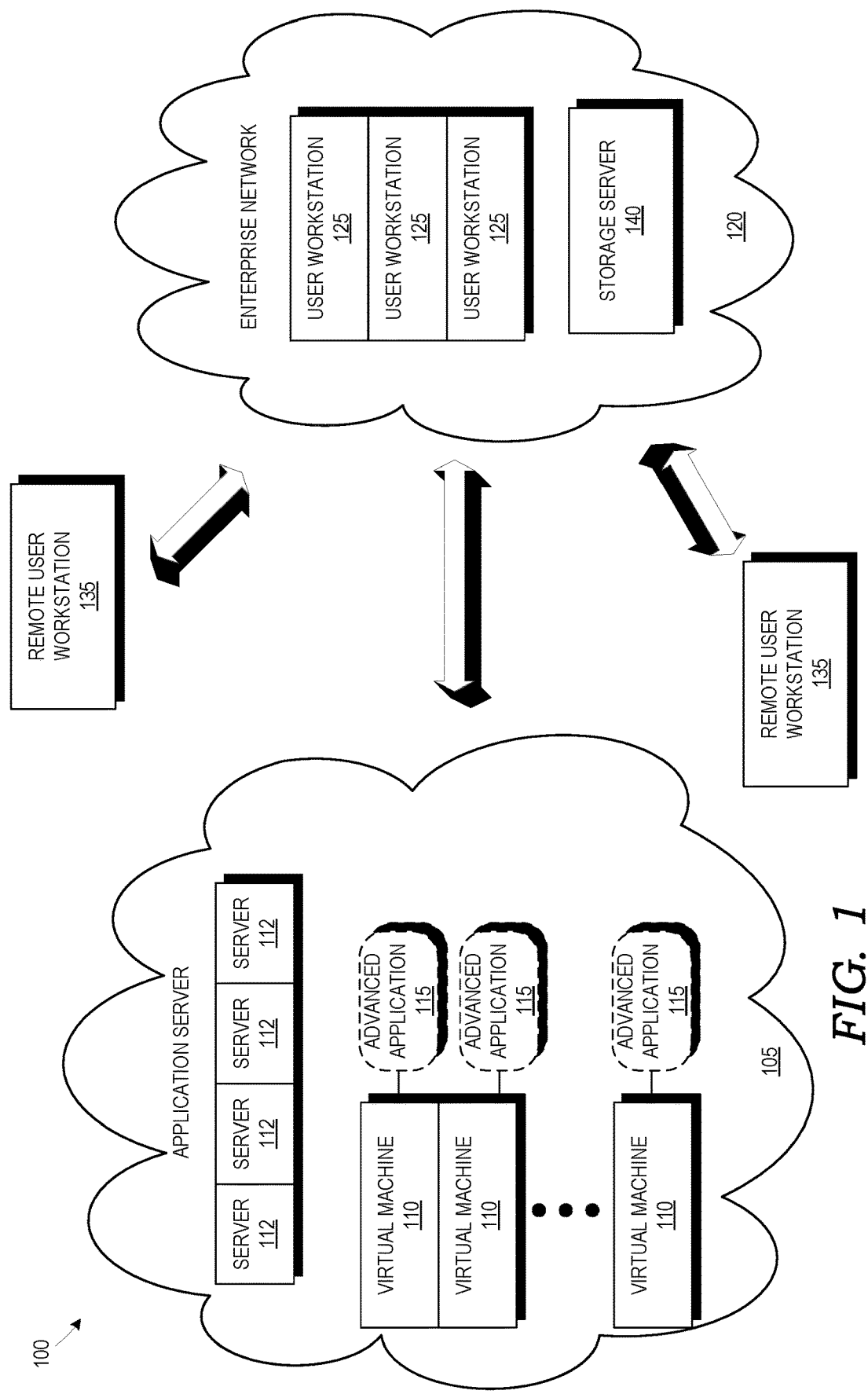
FIG. 1 is a simplified block diagram of a cloud based virtual computing system implementing data management between a local client and a cloud based application in accordance with some embodiments.
Figure 2:
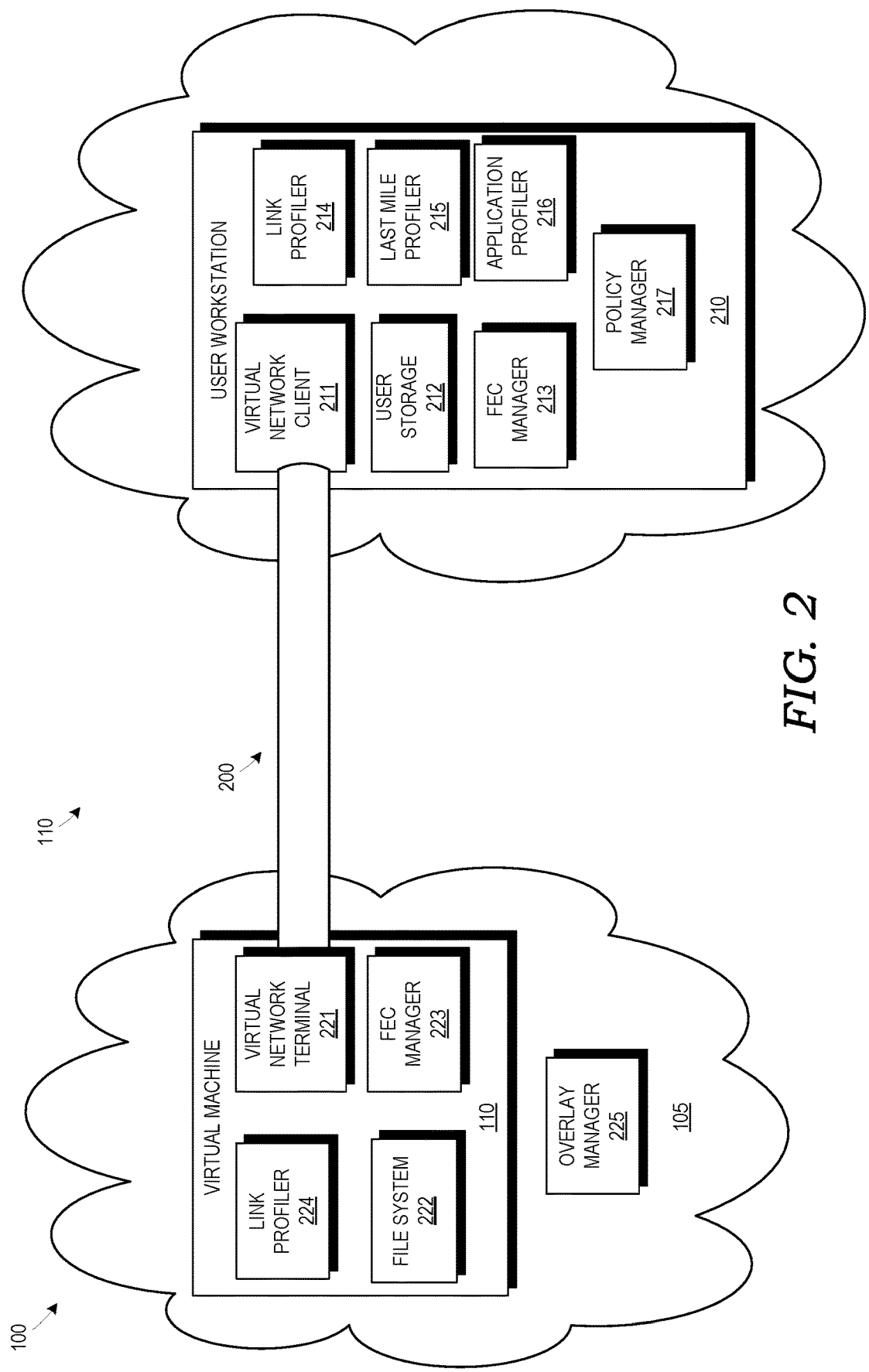
FIG. 2 is a simplified block diagram illustrating a virtual network tunnel between the user workstation and a virtual machine in accordance with some embodiments.
Figure 3:
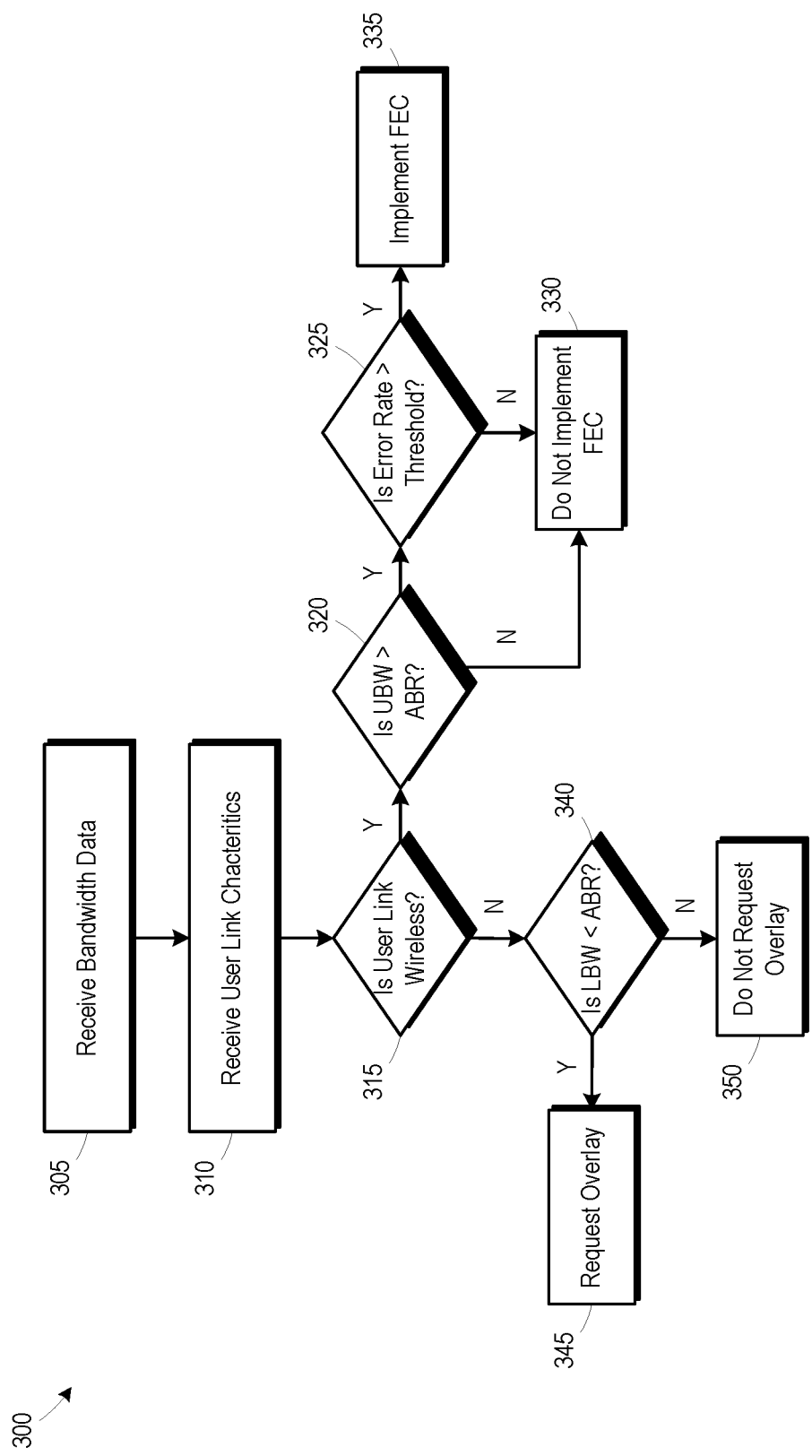
FIG. 3 is a flow diagram of an illustrative method for implementing data management between a local client and a cloud based application, in accordance with some embodiments.

FIGS. 1-3 illustrate a cloud based virtual computing system implementing data management data management between a local client and a cloud based application. In the illustrated examples, virtual workstations may be implemented using a cloud based virtualization system, where users can access advanced applications on virtual machines in the cloud using a local client. The user may interact with advanced application as if a local advanced workstation were being used, but the advanced processing requirements for the application may be handled by the virtualization system.

FIG. 1 is a simplified block diagram of a cloud based virtual computing system 100 in accordance with some embodiments. The system 100 includes an application server 105 operable to support the virtualization of a plurality of virtual machines 110. As known to those of ordinary skill in the art, machine virtualization involves dividing the computing resources of a physical processing unit or units into multiple virtual machines 110, each with its own operating system, software applications, virtual processor, memory, peripheral devices, etc. The virtualization resource allocates physical computing resources from a pool of computing systems, such as cloud infrastructure severs 112, to meet the processing demands of the individual virtual machines 110. A particular virtual machine 110 may employ the processing resources of one or more of the cloud infrastructure servers 112. The cloud infrastructure servers 112 may be implemented by a computing device including one or more processors, memory, one or more communication interfaces, etc. Commercial application servers 105 that enable the use of virtual machines are AZURE® by MICROSOFT® and Amazon Web Services (AWS) by AMAZON®.

In the illustrated embodiment, the virtual machines 110 are employed to execute an advanced application 115. The advanced application 115 is intended to represent a particular software application that has relatively high processing requirements, such that it would typically requires the use of a relatively high powered computing system for its execution. For example, one such application is MATLAB®. However, the application of the subject matter disclosed herein is not limited to a particular software application.

The system 100 also includes an enterprise network 120 including a plurality of local client workstations 125. In the illustrated embodiment, the local client workstations 125 act as terminals for interacting with the virtual machines 110 to allow operation of the advanced applications 115. The use of the virtual machines 110 reduces the constraints on the processing power required for the user workstations 125.

In some embodiments, the enterprise network 120 may support remote user workstations 135 that connect to the enterprise network 120 via secure protocols, such as virtual private network (VPN) connections, and subsequently connect through the enterprise network 120 and the management server 130 to one of the virtual machines 110. In this manner, users may be centrally located at a facility within the enterprise network 120 or they may be dispersed geographically. Such an arrangement supports distance learning for an educational institution or telecommuting for a business. In some embodiments, communications between the workstations 125, 135 and the virtual machines 110 may take place through the Internet using a remote terminal protocol, such as a remote desktop protocol (RDP).

The enterprise network 120 may also include a storage server 140 for storing user data, such as data files, or report files associated with the advanced application 115. In some embodiments, the workstations 125, 135 may have local storage (e.g., drives) for storing the data in conjunction with or in lieu of the storage server 140. The term local storage, as used herein, is intended to imply local to the enterprise network 120 or the terminals 125, 135, as compared to any remote storage provided by the application server 105.

The system 100 allows allow each user to have a separate virtual machine 110 that can be accessed using private credentials (username and password). In the course of operating the user generates various types of code and data (e.g., code related to the process the user wants to run and the output from running such code on various inputs). To provide enhanced privacy for the code and data, the system 100 is configured to provide a virtual tunnel between the enterprise network 120 and the application server 105 and the user's virtual machine 110, as described below.

FIG. 2 is a simplified block diagram illustrating a virtual network tunnel 200 in accordance with some embodiments. A user workstation 210 (e.g., the user workstation 125 or the remote user workstation 135 in FIG. 1) employs the virtual network tunnel 200 to communicate with the virtual machine 110. The user workstation 210 may be implemented by a computing device including one or more processors, memory, a display, a user interface, one or more communication interfaces, etc. The user workstation 210 implements a virtual network client 211, user storage 212, a forward error correction (FEC) manager 213, a link profiler 214, a last mile profiler 215, an application profiler 216, and a policy manager 217. The user storage 215 may be local to the user workstation 202 or local to the enterprise network 120. The virtual machine 110 implements a virtual network terminal 221, a file system 222, a FEC manager 223, and a link profiler 224. In some embodiments, the application server 105 implements an overlay manager 225. In some embodiments, the policy manager 217 receives information regarding the communication link implemented on the virtual network tunnel 200 and configures one or more parameters of the virtual network tunnel 200 based on bandwidth and error characteristics of the communication link.

The virtual network client 205 allows the user workstation 210 to virtually map the user storage 212 to the application server 105 so that the user storage 212 appears to the virtual machine 110 and the advanced application 115 to be a network-mounted file system. Thus, when the user saves any files, be it code or data, onto the network-mounted file system, these files are actually saved in the user storage 212. The user storage 212 may or may not be resident on the user workstation 211. None of the data or code that such a system would generate as part of the user's interaction with the cloud-based server would therefore, be in the file system 222 provided by the application server 105. This approach provides transparency to the advanced application 115. As a consequence, a user's private data can be saved in the user storage 212, thereby enhancing privacy.

In one example, a network file system (NFS) approach may be employed. NFS employs TCP based communication to allow a NFS client device to request content that is stored in a NFS server. Remotely stored content is "mounted" so that clients can access and use the content. When an application mounts a remotely located file system, or makes a request for a file (or parts of a file), it uses a RPC (Remote Procedure Call) to accomplish these goals. The NFS communication may run on TCP or UDP transports, depending on the version of NFS.

In the context of FIG. 2, the file system 222 on the virtual machine 110 represents an NFS client, and the virtual network client 210 acts as an NFS server that mounts the user storage 212. Regardless of the actual physical location of the user storage 212, it appears to be a mounted storage location to the virtual machine 110 and the file system 222. The RPC communication is exchanged through the virtual network client 211 and the virtual network terminal 221. The user may specify the location of the user storage 212 (e.g., attached to user workstation 210, network storage location, etc.). In another embodiment, the virtual network client 211 may implement packet forwarding, where the traffic is simply forwarded packet by packet to the user storage 212. In this manner, the virtual machine 110 sees the user storage 212 as a local drive of the user workstation 210 and maps it accordingly. In actuality, the physical location of the user storage 212 may at another location on the network 120 or on an entirely different computer.

In some embodiments, the application server 105 implements the overlay manger 225 to allow multiple routes for data to be communicated between the virtual machine 110 and the user workstation 210. For example, the cloud infrastructure servers 112 (see FIG. 1) may be connected via a high speed internal network to allow communication therebetween. Within the virtual network tunnel 200, the virtual machine 110 appears to have a single IP address from the viewpoint of the user workstation 210. The overlay manager 225 configures multiple actual transmission control protocol (TCP) paths (e.g., with separate IP addresses) for communicating data over the virtual network tunnel 200. In some embodiments, the overlay manager 225 provides multiple TCP paths in the infrastructure for the user workstation 115 and the virtual machine 110 to send data traffic. Providing multiple physical connections can address a situation where various network segments can be differently overloaded at any given point of time and hence will offer different delay characteristics for different source and destination pairs at any given point of time. In some embodiments, the cloud infrastructure servers 112 in the application server 105 may be spread over large geographical regions, and depending on the kind of applications being run at different cloud infrastructure servers 112, the network path characteristics will vary significantly. The overlay manager 225 intelligently selects alternate paths between the source and destination to increase performance. Hence, at any given time, the IP address of the virtual network tunnel 200 may be directed to a different TCP path using a different IP addresses for different cloud infrastructure servers 112.

In some embodiments, the FEC managers 213, 223 implement a forward error correction algorithm to increase data transmission accuracy. Employing FEC encoding on data traffic systematically introduces redundancy to the data to be transmitted such that the original data can be reconstructed at the destination from only a subset of the encoded traffic. The FEC managers 213, 223 encode or decode the data packets depending on the direction of the data transfer. In some embodiments, example FEC techniques include, but are not limited to, Reed-Solomon codes, low-density parity-check (LDPC) codes, Raptor codes, etc. Employing FEC increases the number of packets to be transmitted compared to the original data, and thus, will be sub-optimal if the network path has low loss characteristics. However, if the network path is lossy, the addition of FEC will increase the possibility that sufficient packets will reach the destination so that the original data can be decoded and hence avoid the delay penalty of retransmitting data.

In some embodiments, the link profilers 214, 224 determine the bandwidth of the virtual network tunnel 200. Evaluating the bandwidth may include determining the bandwidth of a wired path between the user workstation 210 and the application server 105. The wired path exists between one or more of the cloud infrastructure servers 112 configured by the overlay manager 225 and the user workstation 210. The bandwidth may vary by direction of traffic in the virtual network tunnel 200. In some embodiments, the link profiler 214 estimates the bandwidth of the connection between the user workstation 210 and the virtual machine 110, and the link profiler 224 estimates the bandwidth between the virtual machine 110 and the user workstation 210. Example techniques for network link bandwidth estimation include packet pair techniques and packet train techniques.

In some embodiments, the last mile profiler 215 determines whether the communication link employed by a communication interface of the user workstation 210 is wireless and also determines the available bandwidth and link error rates for the user link. Wireless links have significantly different error and bandwidth characteristics compared to wired links. In some embodiments, the user connection link type is determined by querying the underlying operating system regarding the link technology of the communication interface. For example, if the returned technology is 802.11/16 or 4G, the link is wireless. In some embodiments, the last mile profiler 215 determines link error characteristics and link bandwidth characteristics using the device driver of the communication interface. In some embodiments, alternative techniques, such as packet pair, packet train etc. are used with support from a dedicated server to measure the bandwidth for both wired and wireless links. The bandwidth determined by the last mile profiler 215 differs from the bandwidth determined by the link profilers 214 in that the last mile profiler 215 estimates the bandwidth only over the user link (e.g., wired or wireless connection), while the bandwidth determined by the link profilers 214, 224 cover the entire communication path to the virtual machine 110.

In some embodiments, the application profiler 216 provides information regarding the quality of service (QoS) requirements of the application(s) being run on the virtual machine 110. In some embodiments, QoS information includes an application bandwidth requirement (ABR). The ABR may represent a continuous bandwidth requirement or a burstiness metric indicating whether the application traffic generation is likely to come in bursts. The ABR may be represent an actual bandwidth number or a grade (e.g., low, medium, high, bursty, etc.) In some embodiments, the application profiler 215 includes a database of applications and their associated QoS parameters. In some embodiments, the application profiler 216 stores the database locally. In some embodiments, the application profiler 216 accesses the database from an Internet resource. In some embodiments, the application profiler 216 Internet resource only in cases where the local database does not include data for a particular application.

In some embodiments, the policy manager 217 receives bandwidth characteristics and user link characteristics and configures one or more characteristics of the virtual network tunnel 200. In some embodiments, the bandwidth characteristics are received from the link profilers 214, 224 and the last mile profiler 215. In some embodiments, the user link characteristics are received from the last mile profiler 215. In some embodiments, the policy manager 217 decides whether to use multiple communication paths via the overlay manager 225 and/or FEC to optimize data transmission over the virtual network tunnel 200 between the user workstation 210 and the virtual machine 110.

In some embodiments, the policy manager 217 may selectively request that the application server 105 use the overlay manger 225 to provide multiple communication paths. For example, the operator of the application server 105 may charge a premium for enabling and employing the overlay manager 225. Hence, the policy manager 217 may only request the use of the overlay manager 225 when necessary to manage costs.

In some embodiments, the policy manager 217 implements a heuristics-based approach to determine the data transmission strategy. FIG. 3 is a flow diagram of an illustrative method 300 for implementing data management between a local client and a cloud based application, in accordance with some embodiments. In method block 305, the policy manager 217 receives bandwidth data. In some embodiments, the bandwidth data includes link bandwidth data (LBW) determined by one or both of the link profilers 214, 224 and user bandwidth data (UBW) determined by the last mile profiler 215 for the communication interface employed by the user workstation 210.

In method block 310, the policy manager 217 receives user link characteristics from the last mile profile 215. In some embodiments, the user link characteristics include a user connection link type. In some embodiments, the user link characteristics include an error rate and a user link bandwidth (UBR). In method block 315, the policy manager 217 employs the user link characteristics to determine if the user link is wireless. If the user link is wireless in method block 315, the policy manager 217 determines if the user link bandwidth, UBW, is greater than the application bandwidth requirements, ABR. If the UBW is greater than the ABR, excess bandwidth exists, and the policy manager 217 determines if the error rate for the user link is greater than a threshold in method block 325. If there is no excess bandwidth in method block 320 or if the error rate is less than the threshold in method block 325, the policy manager 217 elects not to use FEC in method block 330. If the error rate exceeds the threshold in method block 325, the policy manager 217 elects to use FEC in method block 335. In general, the policy manager 217 implements FEC the network path has a lossy user link, but the user link path has sufficient bandwidth to meet the needs of the application(s) being executed on the virtual machine 110.

If the user link is not wireless in method block 315, the policy manager 217 determines in method block 340 if the link bandwidth LBW received from the link profilers 214, 224 is less than the application bandwidth requirement, ABR, indicating a bandwidth shortfall that could negatively impact performance. If the LBW is less than the ABR in method block 340, the policy manager 217 requests that the application server 105 implement the overlay manager 225 in method block 345. With overlay management enabled, the user workstation 210 receives data from the virtual machine 110 over multiple TCP connections via the virtual network tunnel 200. If the LBW is not less than the ABR in method block 340, the policy manager 217 elects not to request that the application server 105 implement the overlay manager 225 in method block 350. Without overlay management enabled, the user workstation 210 receives data from the virtual machine 110 over a single communication path via the virtual network tunnel 200. The example heuristic approach illustrated in FIG. 3, may be adapted to use different logic for selectively enabling FEC and overlay management.

In some embodiments, the policy manager 217 employs a utility maximization formulation to determining the FEC and overlay parameters as alternative to the heuristic approach illustrated in FIG. 3.

The policy manager 217 selectively implements FEC and overlay management to improve the user perceived performance of the advanced application 115 implemented by the virtual machine 110 by reducing the data transmission time and decreasing error rates to efficiently utilize the available bandwidth. This approach improves the user experience and improves the operation of the cloud based virtual computing system 100.

A method includes establishing a communication link between a communication interface of a first computing device and a virtual machine executed by a second computing device, receiving an available bandwidth parameter associated with the communication link, receiving link characteristic data associated with the communication interface, and configuring a characteristic of the communication link based on the available bandwidth parameter and the link characteristic data.

A system includes a first computing device including a communication interface and executing a policy manager and a second computing device executing a virtual machine. The policy manager is to receive an available bandwidth parameter associated with the communication link, receive link characteristic data associated with the communication interface, and configure a characteristic of the communication link based on the available bandwidth parameter and the link characteristic data.

In some embodiments, certain aspects of the techniques described herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
establishing a communication link between a communication interface of a first computing device and a virtual machine executed by a second computing device;
receiving an available bandwidth parameter associated with the communication link;
receiving link characteristic data associated with the communication interface; and
configuring a characteristic of the communication link based on the available bandwidth parameter and the link characteristic data;
wherein the link characteristic data comprises a link type and an error rate; and
wherein configuring the characteristic of the communication link comprises selectively enabling forward error correction on the communication link based on the link type and the error rate.

2. The method of claim 1, further comprising:
determining an application bandwidth requirement for an application executing on the virtual machine; and
enabling the forward error correction responsive to the link type comprising a wireless link type, the application bandwidth requirement being less than the available bandwidth parameter, and the error rate being greater than a first threshold.

3. The method of claim 2, wherein the available bandwidth parameter comprises an available bandwidth of the communication interface.

4. A method, comprising:
establishing a communication link between a communication interface of a first computing device and a virtual machine executed by a second computing device;
receiving an available bandwidth parameter associated with the communication link;
receiving link characteristic data associated with the communication interface; and
configuring a characteristic of the communication link based on the available bandwidth parameter and the link characteristic data;
wherein configuring the characteristic of the communication link comprises:

selectively requesting overlay management for the communication link from the second computing device based on the bandwidth data and the link characteristic data; and receiving data for the communication link over multiple communication paths.

5. The method of claim 4, wherein the link characteristic data comprises a link type, and the method comprises:

determining an application bandwidth requirement for an application executing on the virtual machine; and selectively requesting overlay management for the communication link from the second computing device responsive to the link type comprising a wired type and the application bandwidth requirement being greater than the available bandwidth parameter.

6. The method of claim 5, wherein the available bandwidth parameter comprises an available bandwidth for the communication link.

7. The method of claim 1, wherein configuring the characteristic of the communication link comprises configuring a forward error correction parameter and an overlay management parameter based on the available bandwidth parameter and the link characteristic data.

8. The method of claim 7, wherein the available bandwidth parameter comprises a link bandwidth parameter for the communication link and a user bandwidth parameter for the communication interface, configuring the forward error correction parameter comprises configuring the forward error correction parameter based on the user bandwidth parameter, and configuring the overlay management parameter comprises configuring the overlay management parameter based on the link bandwidth parameter.

9. A system, comprising:

a first computing device comprising a communication interface and a policy manager; and a second computing device comprising a virtual machine, wherein the policy manager is configured to receive an available bandwidth parameter associated with the communication link, receive link characteristic data associated with the communication interface, and configure a characteristic of the communication link based on the available bandwidth parameter and the link characteristic data;

wherein the link characteristic data comprises a link type and an error rate; and wherein the policy manager is configured to selectively enable forward error correction on the communication link based on the link type and the error rate.

10. The system of claim 9, wherein the policy manager is configured to determine an application bandwidth requirement for an application executing on the virtual machine, and enable the forward error correction responsive to the link type comprising a wireless link type, the application bandwidth requirement being less than the available bandwidth parameter, and the error rate being greater than a first threshold.

11. The system of claim 10, wherein the available bandwidth parameter comprises an available bandwidth of the communication interface.

12. A system, comprising:

a first computing device comprising a communication interface and a policy manager; and a second computing device comprising a virtual machine, wherein the policy manager is configured to receive an available bandwidth parameter associated with the communication link, receive link characteristic data associated with the communication interface, and configure a characteristic of the communication link based on the available bandwidth parameter and the link characteristic data;

wherein the policy manager is configured to selectively request overlay management for the communication link from the second computing device based on the bandwidth data and the link characteristic data and receive data for the communicate link over multiple communication paths.

13. The system of claim 12, wherein the link characteristic data comprises a link type, and the policy manager is configured to receive an application bandwidth requirement for an application executing on the virtual machine and selectively request overlay management for the communication link from the second computing device responsive to the link type comprising a wired type and the application bandwidth requirement being greater than the available bandwidth parameter.

14. The system of claim 13, wherein the available bandwidth parameter comprises an available bandwidth for the communication link.

15. The system of claim 9, wherein the policy manager is configured to configure a forward error correction parameter and an overlay management parameter based on the available bandwidth parameter and the link characteristic data.

16. The system of claim 15, wherein the available bandwidth parameter comprises a link bandwidth parameter for the communication link and a user bandwidth parameter for the communication interface, and the policy manager is configured to configure the forward error correction parameter based on the user bandwidth parameter and configure the overlay management parameter based on the link bandwidth parameter.

* * * * *